United States Patent
Kim

(10) Patent No.: US 9,302,560 B2
(45) Date of Patent: Apr. 5, 2016

(54) STABILIZER LINK

(71) Applicant: Hyundai Motor Company, Seoul (KR)

(72) Inventor: Jae Hun Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/475,244

(22) Filed: Sep. 2, 2014

(65) Prior Publication Data

US 2015/0174978 A1   Jun. 25, 2015

(30) Foreign Application Priority Data

Dec. 23, 2013   (KR) .................. 10-2013-0161882

(51) Int. Cl.
| | | |
|---|---|---|
| *B60G 7/00* | (2006.01) | |
| *B60G 21/055* | (2006.01) | |
| *F16C 11/06* | (2006.01) | |

(52) U.S. Cl.
CPC .............. *B60G 7/005* (2013.01); *B60G 21/055* (2013.01); *B60G 21/0551* (2013.01); *F16C 11/068* (2013.01); *F16C 11/0676* (2013.01); *F16C 11/0695* (2013.01); *B60G 2204/1224* (2013.01); *B60G 2204/416* (2013.01); *B60G 2206/11* (2013.01); *Y10T 403/32737* (2015.01)

(58) Field of Classification Search
CPC .. B60G 7/005; B60G 21/055; B60G 21/0551; B60G 2204/1224; B60G 2204/416; B60G 2206/11; B62D 7/16; F16C 11/06; F16C 11/0666; F16C 11/0676; F16C 11/068; F16C 11/0695; F16J 3/02; F16J 3/04; F16J 3/042; F16J 15/16
USPC .................. 403/50, 51, 90, 122, 133–135
See application file for complete search history.

(56) References Cited

U.S. PATENT DOCUMENTS

| | | | | |
|---|---|---|---|---|
| 5,312,200 | A | * 5/1994 | Buhl et al. .................... | 403/134 |
| 6,109,816 | A | 8/2000 | Iwasaki | |
| 2009/0047063 | A1 | * 2/2009 | Shirai et al. .................. | 403/133 |

FOREIGN PATENT DOCUMENTS

| | | |
|---|---|---|
| KR | 1997-0034313 A | 7/1997 |
| KR | 10-2012-0000958 A | 1/2012 |

* cited by examiner

*Primary Examiner* — Josh Skroupa
(74) *Attorney, Agent, or Firm* — Morgan, Lewis & Bockius LLP

(57) ABSTRACT

A stabilizer link apparatus may include ball studs having balls at terminals thereof, a link having ball sockets at upper and lower ends thereof, the balls being rotatably accommodated in the ball sockets, dust covers assembled between circumferences of the ball sockets and middle sections of the ball studs, the dust covers preventing impurities from invading the ball sockets, and friction-providing unit engaged between the ball stud and the link, wherein the friction-providing unit provide predetermined amounts of rotating frictional resistance to the ball studs when the ball studs rotate with respect to the link such that the rotating frictional resistance of the ball stud at the lower end of the link is greater than the rotating frictional resistance of the ball stud at the upper end of the link.

7 Claims, 4 Drawing Sheets

FIG. 4

| Thickener (5~20%) | Base oil (70~90%) | Additive (1~10%) |
|---|---|---|
| Soap(Li,Ca,Al)<br>Li complex<br>Polyurea<br>Organic bentonite<br>Silica gel<br>PTFE | Mineral oil<br>PAO<br>Alkyl benzene<br>Ester oil<br>Silicone oil<br>PFPE | Extreme pressure additive<br>Anti-wear agent<br>Anti-oxidation agent<br>Anti-rust agent<br>Structure regulating agent (Polymer) |

STABILIZER LINK

CROSS REFERENCE TO RELATED APPLICATION

The present application claims priority to Korean Patent Application No. 10-2013-0161882, filed on Dec. 23, 2013, the entire contents of which is incorporated herein for all purposes by this reference.

BACKGROUND OF THE INVENTION

1. Field of the Invention

The present invention relates to a stabilizer link, and more particularly, to a stabilizer link which is intended to structurally reduce the swaying of a lower part thereof during the operation of a vehicle such that tension in a dust cover is reduced, thereby improving sealing performance.

2. Description of Related Art

A stabilizer is a stabilization device that prevents the body of a vehicle from lurching to the right and left. Unlike a shock absorber which prevents the vehicle from oscillating in the vertical direction, the stabilizer prevents the vehicle body from swaying to the right and left.

The stabilizer is connected to a strut via a stabilizer link, and conducts stability control in response to the rolling of the vehicle.

Both ends of the stabilizer link are configured as a ball joint in which a ball of a ball stud is rotatably disposed inside a ball socket. The upper end of the stabilizer link is rotatably fastened to the stabilizer, and the lower end of the stabilizer link is rotatably fastened to the strut.

However, the ball joints which are disposed on the upper end and the lower end of the stabilizer link are subjected to irregular rotating frictional resistances in the ball studs due to part and assembly tolerances.

The ball joint section which has low rotating frictional resistance first starts to rotate and sway until arriving at the maximum rolling angle. Afterwards, the ball joint section which has relatively higher rotating frictional resistance starts to roll and sway.

As the rolling and swaying continues, tension is applied to the dust cover so that a sealing section which seals the area between the ball stud and the dust cover is opened. Thus, impurities are introduced into the dust cover and the ball stud is rusted, thereby causing the problem of noise.

In particular, the lower ball joint section that is mounted close to the ground is subjected more to impurities and road conditions than the upper ball joint section. There are problems such as low sealing performance and frequent quality claims.

In this approach, however, it is difficult to improve the sealing performance of the ball joint section which is disposed in the lower part.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a stabilizer link which is intended to structurally reduce the swaying of a lower part thereof during the operation of a vehicle such that tension in a dust cover is reduced, thereby improving sealing performance.

In order to achieve the above object, according to one aspect of the present invention, there is provided a stabilizer link that includes: ball studs having balls at terminals, a link having ball sockets at upper and lower ends, the balls being rotatably accommodated in the ball sockets, dust covers assembled between circumferences of the ball sockets and middle sections of the ball studs, the dust covers preventing impurities from invading the ball sockets, and friction-providing unit.

The friction-providing unit provides predetermined amounts of rotating frictional resistance to the ball studs when the ball studs rotate with respect to the link such that the rotating frictional resistance of the ball stud at the lower end of the link is greater than the rotating frictional resistance of the ball stud at the upper end of the link.

According to an embodiment of the invention, the friction-providing unit may include grooves along middle sections of the ball studs and hollow-centered hole sections at terminals of the dust covers, outer circumferences of the grooves being fitted into the inner circumference of the hole sections, O-rings being fastened to outer circumferences of the hole sections. The inner diameter of the O-rings fastened to the dust cover at the lower end of the link may be smaller than the inner diameter of the O-rings fastened to the dust cover at the upper end of the link.

The thickness of the O-rings fastened to the dust cover at the lower end of the link may be greater than the thickness of the O-rings fastened to the dust cover at the upper end of the link.

The number of the O-rings fastened to the dust cover at the lower end of the link may be more than the number of the O-rings fastened to the dust cover at the upper end of the link.

The friction providing unit may include grooves along middle sections of the ball studs and hollow-centered hole sections at terminals of the dust covers, outer circumferences of the grooves being fitted into the inner circumference of the hole sections, O-rings being fastened to outer circumferences of the hole sections. The O-rings may be fastened to the dust cover at the lower end of the link and not fastened to the dust cover at the upper end of the link.

The friction providing unit may include grooves along middle sections of the ball studs and hollow-centered hole sections at terminals of the dust covers, outer circumferences of the grooves being fitted into the inner circumference of the hole sections. The inner diameter of the hole sections provided in the dust cover at the lower end of the link may be smaller than the inner diameter of the hole sections provided in the dust cover at the upper end of the link.

The friction providing unit may include grooves along middle sections of the ball studs and hollow-centered hole sections at terminals of the dust covers, outer circumferences of the grooves being fitted into the inner circumference of the hole sections. The thickness of a section that extends from a middle section of the dust cover at the lower end of the link to the hole section may be greater than the thickness of a section that extends from a middle section of the dust cover at the upper end of the link to the hole section.

The thickness may be a thickness of a predetermined portion of each of the sections that extends from the middle section of the dust cover to the hole section, the predetermined portion being adjacent to the hole section.

The friction providing unit may include frictional bearings at inner ends of the ball sockets. The balls may be rotatably accommodated inside the frictional bearings. Grease may be supplied between the balls and the frictional bearings. The rotational torque of the grease supplied between the ball and the frictional bearing at the lower end of the link may be smaller than a rotational torque of the grease supplied between the ball and the frictional bearing at the upper end of the link.

As set forth above, the stabilizer link according to embodiments of the present invention is configured such that the rotating frictional resistance of the ball stud disposed at the lower end of the stabilizer link is greater than the rotating frictional resistance of the ball stud disposed at the upper end of the stabilizer link. This consequently reduces tension in the dust cover disposed at the lower end of the link. Since the sealing performance of the lower dust cover is improved, the invasion of impurities into the dust cover is minimized and thus the reason for noises in the stabilizer link is advantageously removed.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 4 is a view illustrating the composition of grease used in the present invention.

Figure 1:
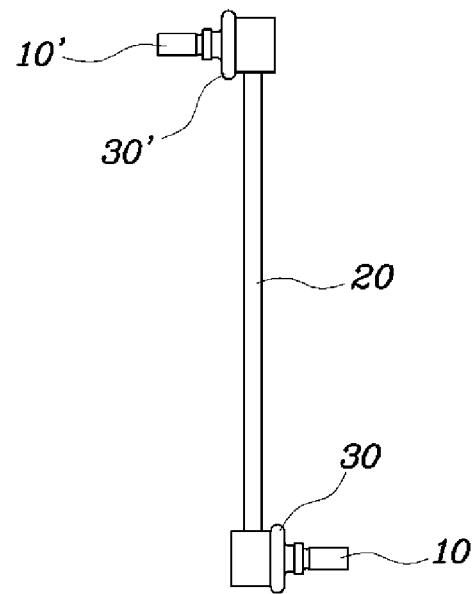
FIG. 1 is a view showing the shape of a stabilizer according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in greater detail to an exemplary embodiment of the present invention, an example of which is illustrated in the accompanying drawings. Wherever possible, the same reference numerals will be used throughout the drawings and the description to refer to the same or like parts.

Figure 2A:
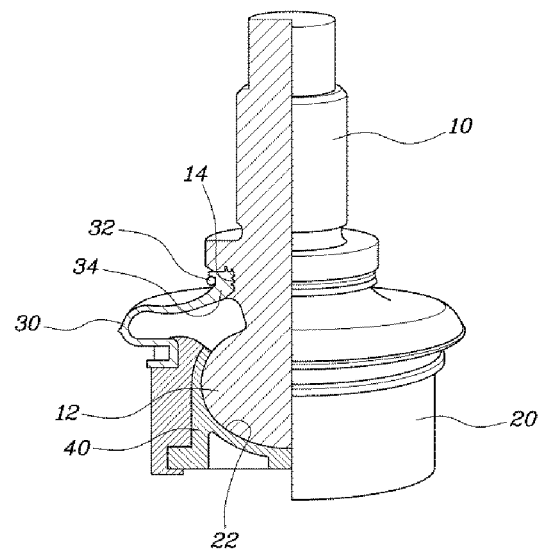
FIGS. 2A, 2B, and 2C are views showing the structure of a ball stud assembly structure at one end of a stabilizer link.
Figure 2B:
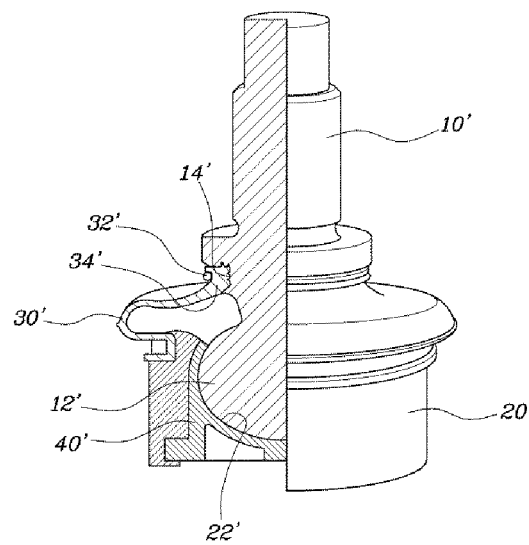
Figure 2C:
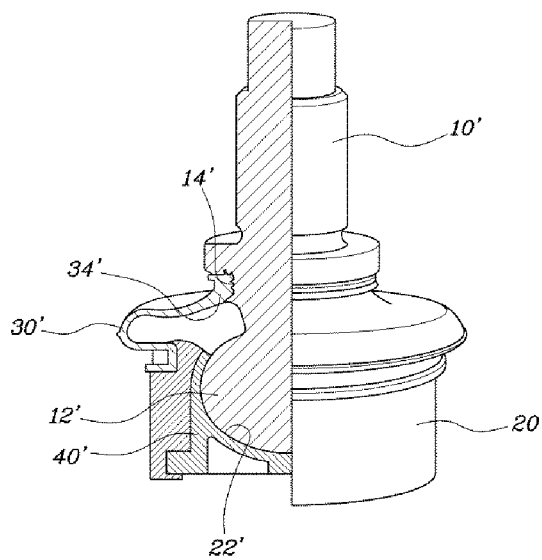
Figure 3A:
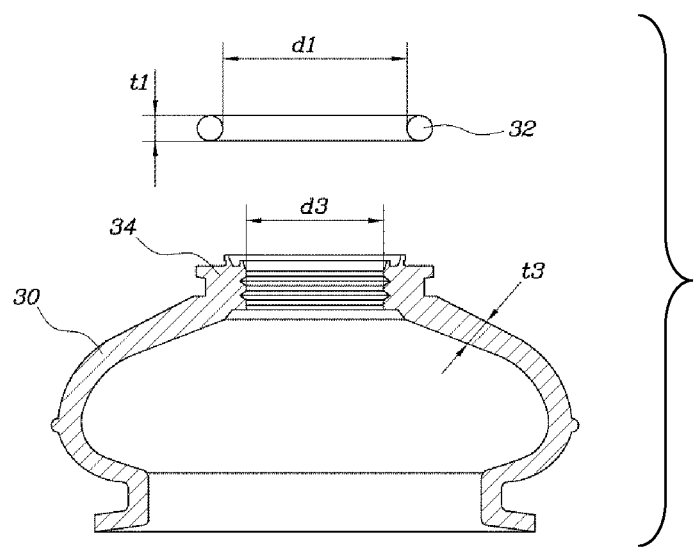
FIGS. 3A and 3B are views showing the cross-sectional structure of an O-ring and a dust cover.
Figure 3B:
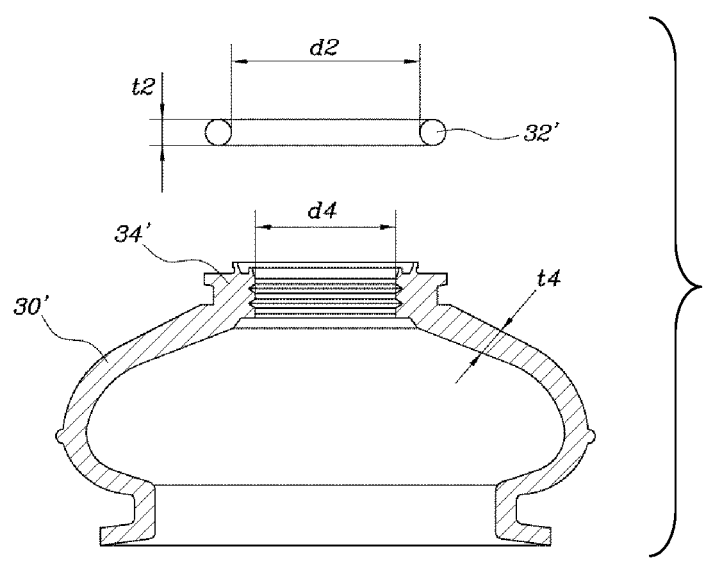

FIG. 1 is a view showing the shape of a stabilizer according to an exemplary embodiment of the present invention, FIGS. 2A, 2B, and 2C are views showing the structure of a ball stud assembly structure at one end of a stabilizer link, FIGS. 3A and 3B are views showing the cross-sectional structure of an O-ring and a dust cover, and FIG. 4 is a view illustrating the composition of grease used in an exemplary embodiment of the present invention.

The stabilizer link according an exemplary embodiment of the present invention generally includes ball studs 10 and 10', a link 20, dust covers 30 and 30' and friction-providing unit.

Describing the present invention in more detail with reference to FIGS. 1 to FIGS. 3A and 3B, the ball studs 10 and 10' have balls 12 and 12' at the terminals. The link 20 has ball sockets 22 and 22' on the upper and lower ends such that the balls 12 and 12' are rotatably fitted into the ball sockets 22 and 22'. The dust covers 30 and 30' are assembled between the circumference of the ball sockets 22 and 22' and the middle sections of the ball studs 10 and 10' in order to prevent impurities from invading the ball sockets 22 and 22'.

In particular, when the ball studs 10 and 10' rotate about the link 20, a certain amount of rotating frictional resistance is provided to the ball studs 10 and 10' by the friction-providing unit. The rotating frictional resistance of the ball stud 10 at the lower end of the link 20 is configured to be greater than the rotating frictional resistance of the ball stud 10' at the upper end.

The coupling structure between the ball studs 10 and 10' and the link 20 is configured as a ball joint coupling structure which prevents the balls 12 and 12' from escaping from the ball sockets 22 and 22' while allowing the balls 12 and 12' to rotate in the ball sockets 22 and 22'

Since the rotating frictional resistance of the ball stud 10 disposed on the lower end of the stabilizer link is greater than the rotating frictional resistance of the ball stud 10' disposed on the upper end of the stabilizer link, the amount of rotation and swaying at the lower end of the link are smaller than the amount of rotation and swaying at the upper end of the link. Tension in the dust cover 30 disposed at the lower end of the link 20 is reduced. Therefore, the sealing performance of the dust cover 30 disposed on the lower end of the link 20 is improved. This minimizes the invasion of impurities into the dust cover 30, thereby removing the reason for noises in the stabilizer link.

According an exemplary embodiment of the present invention, the friction-providing unit has grooves 14 and 14' along the circumferences of the middle sections of the ball studs 10 and 10'. Hollow-centered hole sections 34 and 34' are formed in the terminals of the dust covers 30 and 30' such that the outer circumferences of the grooves 14 and 14' are fitted into the inner circumferences of the hole sections 34 and 34'. O-rings 32 and 32' are fastened to the outer circumferences of the hole sections 34 and 34'. The inner diameter d1 of the O-rings 32 fastened to the dust cover 30 at the lower end of the link 20 can be smaller than the inner diameter d2 of the O-rings 32' fastened to the dust cover 30' at the upper end of the link 20.

According to an exemplary embodiment, when the inner diameter d1 of the O-rings 32 fastened to the lower dust cover 30 is φ16, the inner diameter d2 of the O-rings 32' fastened to the upper dust cover 30' can be φ18.

Since the inner diameter d1 of the O-rings fastened to the dust cover 30 at the lower end of the link is smaller than the inner diameter d2 of the O-rings 32' at the upper end of the link 20, the coupling force of the dust cover 30 and the ball stud 10 which are fastened to the lower end of the link 20 is greater than that at the upper end of the link 20. Therefore, the rotational frictional resistance of the ball stud 10 at the lower end of the link 20 is greater than the rotational frictional resistance of the ball stud 10' at the upper end of the link 20, thereby improving the sealing performance of the lower dust cover 30.

In addition, the thickness t1 of the O-rings 32 fastened to the dust cover 30 at the lower end of the link 20 can be greater than the thickness t2 of the O-rings 32' fastened to the dust cover 30' at the upper end of the link 20.

Since the thickness t1 of the O-rings 32 fastened to the dust cover 30 at the lower end of the link 20 is greater than the thickness t2 of the O-rings 32' at the upper end of the link 20, the coupling force between the dust cover 30 and the ball stud 10 fastened to the lower end of the link 20 is greater than that at the upper end of the link 20. Therefore, the rotational frictional resistance of the ball stud 10 at the lower end of the link 20 is greater than the rotational frictional resistance of the ball stud 10' at the upper end of the link 20, thereby improving the sealing performance of the lower dust cover 30.

In addition, the number of the O-rings 32 fastened to the dust cover 30 at the lower end of the link 20 can be more than the number of the O-rings 32' fastened to the dust cover 30' at the upper end of the link 20.

Here, the O-rings 32 and 32' can have the same thickness, and the O-rings can be fastened in the stacked fashion.

Since the number of the 0-rings 32 fastened to the dust cover 30 at the lower end of the link 20 is more than the number of the O-rings 32' fastened to the dust cover 30' at the upper end of the link 20, the coupling force between the dust cover 30 and the ball stud 10 fastened to the lower end of the link 20 is greater than that at the upper end of the link 20. Therefore, the rotational frictional resistance of the ball stud 10 at the lower end of the link 20 is greater than the rotational frictional resistance of the ball stud 10' at the upper end of the link 20, thereby improving the sealing performance of the lower dust cover 30.

According an exemplary embodiment of the present invention, the friction-providing unit includes the grooves 14 and 14' along the middle sections of the ball studs 10 and 10' and the hollow-centered hole sections 34 and 34' at the outer circumferences of the grooves 14 and 14', in which the outer circumferences of the grooves 14 and 14' are fitted into the inner circumference of the hole sections 34 and 34'. The O-rings 32 are fastened to the outer circumference of the hole section 34. The O-rings 32 are fastened to the dust cover 30 at the lower end of the link 20, and may not be fastened to the dust cover 30' at the upper end of the link 20.

Since the O-rings 32 are fastened to only the dust cover 30 at the lower end of the link 20, the rotational frictional resistance of the ball stud 10 at the lower end of the link 20 is greater than the rotational frictional resistance of the ball stud 10' at the upper end of the link 20, thereby improving the sealing performance of the lower dust cover 30.

Referring to FIGS. 3A and 3B, the friction-providing unit includes the grooves 14 and 14' along the middle sections of the ball studs 10 and 10' and the hollow-centered hole sections 34 and 34' at the terminals of the dust covers 30 and 30', in which the outer circumferences of the grooves 14 and 14' are fitted into the inner circumference of the hole sections 34 and 34'. The inner diameter d3 of the hole section 34 formed in the dust cover 30 at the lower end of the link 20 can be smaller than the inner diameter d4 of the hole section 34' formed in the dust cover 30' at the upper end of the link 20.

According to an exemplary example, when the inner diameter d3 of the hole section 34 formed in the lower dust cover 30 is φ10, the inner diameter d4 of the hole section 34' formed in the upper dust cover 30' can be φ11.

Since the inner diameter of the hole section 34 formed in the dust cover 30 at the lower end of the link 20 is smaller than the inner diameter d4 of the hole section 34' formed in the dust cover 30' at the upper end of the link, the coupling force between the dust cover 30 and the ball stud 10 fastened to the lower end of the link 20 is greater than that at the upper end of the link 20. Therefore, the rotational frictional resistance of the ball stud 10 at the lower end of the link 20 is greater than the rotational frictional resistance of the ball stud 10' at the upper end of the link 20, thereby improving the sealing performance of the lower dust cover 30.

According to an exemplary embodiment of the present invention, the friction-providing unit includes the grooves 14 and 14' along the middle sections of the ball studs 10 and 10' and the hollow-centered hole sections 34 and 34' at the terminals of the dust covers 30 and 30', in which the outer circumferences of the grooves 14 and 14' are fitted into the inner circumference of the hole sections 34 and 34'. The thickness t3 of the section that extends from the middle section of the dust cover 30 at the lower end of the link 20 to the hole section 34 can be greater than the thickness t4 of the section that extends from the middle section of the dust cover 30' at the upper end of the link 20 to the hole section 34'.

Here, the thicknesses t3 and t4 can be the thicknesses t3 and t4 of predetermined portions from the sections that extend from the middle sections of the dust covers 30 and 30' to the hole sections 34 and 34', the predetermined portions being adjacent to the hole sections 34 and 34'.

According to an exemplary example, when the thickness t3 of the portion that extends from the middle section of the dust cover 30 to the hole section 34 ranges from 1.6 to 2.4 t, the thickness t4 of the section that extends from the middle section of the upper dust cover 30' to the hole section 34' can range from 1.4 to 1.6 t.

Here, both the lower dust cover 30 and the upper dust cover 30' can be configured such that the maximum outer diameter is 1.4 t.

Since the thickness t3 of the portion that forms the dust cover 30 at the lower end of the link 20 is greater than the thickness t4 of the portion that forms the dust cover 30' at the upper end of the link 20, the tensile resistance of the dust cover 30 fastened to the lower end of the link 20 is further increased. Therefore, the rotational frictional resistance of the ball stud 10 at the lower end of the link 20 is greater than the rotational frictional resistance of the ball stud 10' at the upper end of the link 20, thereby improving the sealing performance of the lower dust cover 30.

Referring to FIGS. 2A, 2B, and 2C and 4, the friction-providing unit includes frictional bearings 40 and 40' at the inner ends of the ball sockets 22 and 22'. The balls 12 and 12' are rotatably accommodated inside the frictional bearings 40 and 40', and grease is used as a lubricant between the balls 12 and 12' and the frictional bearings 40 and 40'. The rotational torque of the grease supplied between the ball 12 and the frictional bearing 40 at the lower end of the link 20 can be smaller than the rotational torque of the grease supplied between the ball 12' and the frictional bearing 40' at the upper end of the link 20.

According to an exemplary example, the grease supplied between the ball 12 and the frictional bearing 40 at the lower end of the link 20 can generate a rotational torque of 8 kg·cm, whereas the grease supplied between the ball 12' and the frictional bearing 40' at the upper end of the link 20 can generate a rotational torque of 15 kgf·cm.

Lubricating grooves (with no numeral references) can be formed in the inner surfaces of the frictional bearings 40 and 40' such that the grease can be supplied therethrough.

In addition, as shown in FIG. 4, the grease is manufactured by mixing a thickener, base oil and additives. It is possible to manufacture the grease having different rotational torques by mixing different ratios of the composition components.

In particular, the composition component among the above-mentioned composition components of the grease that is most influential to the rotational torque is base oil. Among various types of the base oil, the use of silicone oil decreases the frictional torque. In contrast, the use of mineral oil increases the frictional torque.

The base oil is a factor that is directly related to kinetic viscosity (Cento Stroke). When the kinetic viscosity is increased, the coefficients of friction of extreme pressure lubrication and mixing/boundary lubricating parts can be reduced.

Since the rotational torque of the grease supplied into the ball socket 22 at the lower end of the link 20 is smaller than the rotational torque of the grease supplied into the ball socket 22' at the upper end of the link 20', the rotating frictional resistance of the ball stud 10 fastened to the lower end of the link 20 is greater than the rotational frictional resistance of the ball stud 10' fastened to the upper end of the link 20, thereby improving the sealing performance of the lower dust cover 30.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A stabilizer link apparatus comprising:
    ball studs having balls at terminals thereof;
    a link having a ball socket at each of upper and lower ends thereof, the balls being rotatably accommodated in the ball sockets;
    dust covers assembled between circumferences of the ball sockets and middle sections of the ball studs, the dust covers preventing impurities from invading the ball sockets; and
    a friction-providing unit engaged between the ball stud and the link,
    wherein the friction-providing unit provides predetermined amounts of rotating frictional resistance to the ball studs when the ball studs rotate with respect to the link such that the rotating frictional resistance of the ball stud at the lower end of the link is greater than the rotating frictional resistance of the ball stud at the upper end of the link, and
    wherein the friction-providing unit includes grooves along the middle sections of the ball studs and hollow-centered hole sections at terminals of the dust covers, outer circumferences of the grooves being fitted into an inner circumference of the hole sections, O-rings being fastened to outer circumferences of the hole sections, and
    wherein an inner diameter of the O-rings fastened to the dust cover at the lower end of the link is smaller than an inner diameter of the O-rings fastened to the dust cover at the upper end of the link.

2. The stabilizer link apparatus according to claim 1, wherein a thickness of the O-rings fastened to the dust cover at the lower end of the link is greater than a thickness of the O-rings fastened to the dust cover at the upper end of the link.

3. A stabilizer link apparatus comprising:
    ball studs having balls at terminals thereof;
    a link having a ball socket at each of upper and lower ends thereof, the balls being rotatably accommodated in the ball sockets;
    dust covers assembled between circumferences of the ball sockets and middle sections of the ball studs, the dust covers preventing impurities from invading the ball sockets; and
    a friction-providing unit engaged between the ball stud and the link,
    wherein the friction-providing unit provides predetermined amounts of rotating frictional resistance to the ball studs when the ball studs rotate with respect to the link such that the rotating frictional resistance of the ball stud at the lower end of the link is greater than the rotating frictional resistance of the ball stud at the upper end of the link,
    wherein the friction-providing unit includes grooves along the middle sections of the ball studs and hollow-centered hole sections at terminals of the dust covers, outer circumferences of the grooves being fitted into inner circumference of the hole sections, and
    wherein the O-rings are fastened to the dust cover at the lower end of the link and not fastened to the dust cover at the upper end of the link.

4. A stabilizer link apparatus comprising:
    ball studs having balls at terminals thereof;
    a link having a ball socket at each of upper and lower ends thereof, the balls being rotatably accommodated in the ball sockets;
    dust covers assembled between circumferences of the ball sockets and middle sections of the ball studs, the dust covers preventing impurities from invading the ball sockets; and
    a friction-providing unit engaged between the ball stud and the link,
    wherein the friction-providing unit provides predetermined amounts of rotating frictional resistance to the ball studs when the ball studs rotate with respect to the link such that the rotating frictional resistance of the ball stud at the lower end of the link is greater than the rotating frictional resistance of the ball stud at the upper end of the link,
    wherein the friction-providing unit includes grooves along the middle sections of the ball studs and hollow-centered hole sections at terminals of the dust covers, outer circumferences of the grooves being fitted into the inner circumference of the hole sections, and
    wherein an inner diameter of the hole sections provided in the dust cover at the lower end of the link is smaller than an inner diameter of the hole sections provided in the dust cover at the upper end of the link.

5. A stabilizer link apparatus comprising:
    ball studs having balls at terminals thereof;
    a link having a ball socket at each of upper and lower ends thereof, the balls being rotatably accommodated in the ball sockets;

dust covers assembled between circumferences of the ball sockets and middle sections of the ball studs, the dust covers preventing impurities from invading the ball sockets; and a friction-providing unit engaged between the ball stud and the link, wherein the friction-providing unit provides predetermined amounts of rotating frictional resistance to the ball studs when the ball studs rotate with respect to the link such that the rotating frictional resistance of the ball stud at the lower end of the link is greater than the rotating frictional resistance of the ball stud at the upper end of the link, wherein the friction-providing unit includes grooves along the middle sections of the ball studs and hollow-centered hole sections at terminals of the dust covers, outer circumferences of the grooves being fitted into the inner circumference of the hole sections, and wherein a thickness of a section that extends from a middle section of the dust cover at the lower end of the link to the hole section is greater than a thickness of a section that extends from a middle section of the dust cover at the upper end of the link to the hole section.

6. The stabilizer link according to claim 5, wherein the thickness is a thickness of a predetermined portion of each of the sections that extends from the middle section of the dust cover to the hole section, the predetermined portion being adjacent to the hole section.

7. A stabilizer link apparatus comprising:
ball studs having balls at terminals thereof;
a link having a ball socket at each of upper and lower ends thereof, the balls being rotatably accommodated in the ball sockets;
dust covers assembled between circumferences of the ball sockets and middle sections of the ball studs, the dust covers preventing impurities from invading the ball sockets; and
a friction-providing unit engaged between the ball stud and the link,
wherein the friction-providing unit provides predetermined amounts of rotating frictional resistance to the ball studs when the ball studs rotate with respect to the link such that the rotating frictional resistance of the ball stud at the lower end of the link is greater than the rotating frictional resistance of the ball stud at the upper end of the link,
wherein the friction-providing unit includes frictional bearings at inner ends of the ball sockets,
wherein the balls are rotatably accommodated inside the frictional bearings, and grease is supplied between the balls and the frictional bearings, and
wherein a rotational torque of the grease supplied between the ball and the frictional bearing at the lower end of the link is smaller than a rotational torque of the grease supplied between the ball and the frictional bearing at the upper end of the link.

* * * * *